Jan. 13, 1959

B. McMILLAN 2,868,963

PULSE PROBABILITY MODULATION SYSTEM

Filed Aug. 20, 1954

INVENTOR
B. McMILLAN
BY *H. O. Wright*
ATTORNEY

United States Patent Office 2,868,963
Patented Jan. 13, 1959

2,868,963

PULSE PROBABILITY MODULATION SYSTEM

Brockway McMillan, Summit, N. J., assignor to Bell Telephone Laboratories, Incorporated, New York, N. Y., a corporation of New York Application August 20, 1954, Serial No. 451,107

3 Claims. (Cl. 250—6)

The present invention relates to improvements in pulse code modulation systems for eliminating peaks of noise power in the signal band introduced by the coding process.

Numerous intelligence transmission systems employing quantization of signal samples are well known to those skilled in the art. The basic features in the operation of such systems are, briefly, that the original signal to be transmitted is sampled at a rate in excess of twice the highest frequency present in the signal, to create a pulse-amplitude modulated signal representative of the original; that the samples are individually "quantized," i. e., classified as falling within a particular one of a plurality of amplitude levels or steps; that, for pulse code modulation, each sample is converted into a plurality of pulses of equal amplitude, spaced in time to represent the proper amplitude level or step in an appropriate and convenient code system; that the code pulses are transmitted to the receiving station where they are decoded and converted back into a pulse-amplitude modualted signal; and that the pulse-amplitude modulated signal thus obtained at the receiver is converted back into a signal having substantially the characteristics of the original signal. For a more detailed discussion of pulse code modulation systems, reference may be had to the following illustrative articles: "Pulse Code Modulation," by H. S. Black and J. O. Edson, published in 1947 in the Transactions of the American Institute of Electrical Engineers, volume 66, at pages 895 to 899; and "Delta Modulation," by F. de Jager, Phillips Research Reports, volume 7, pages 442–466, 1952.

In pulse code modulation systems, the processes of "sampling" and "quantization" introduce perceptible amounts of unwanted electrical energy having the general character of "noise" but often distinguishable from the latter by having a regularly repetitive character, whereas "noise" is normally of a random and irregular character.

The lower the number of steps, or amplitude levels, into which the pulse-amplitude modulated signal (obtained by the sampling of the original signal) is quantized, the larger are the errors introduced by quantization and the more troublesome is the unwanted regularly recurrent energy introduced by the quantizing process as mentioned above, since its predominant frequencies fall within the same range of frequencies as that employed in the transmission of the wanted signal. The above-described unwanted energy introduces appreciable distortion or interference. This distortion or interference in the case of audio signals may appear as regularly repetitive "noise." In the case of video signals, it appears as unwanted "contour lines" on the picture of the cathode-ray oscilloscope where changes of shading along definitely distinguishable lines become apparent.

It has previously been proposed to introduce an additional square wave with the original signal, the square wave having an amplitude of substantially one half the amplitude of a quantizing step and a frequency of one half the sampling frequency so that half the samples will be caused to fall into the next higher or the next lower step than in the absence of the added square wave. It has also been proposed to introduce an additional amount of random noise with the original signal. While these additional "dither" voltages serve to mask out the repetitive noise, they also have the undesired effect of degrading the over-all signal-to-noise ratio to a substantial extent.

Accordingly, the principal object of the present invention is to eliminate peaks of noise power in the signal band of pulse code modulation systems, while concurrently controlling the total noise power added to the signal.

This is accomplished in accordance with the present invention by the use of a biased random element in the quantization process. Thus, for specific example, if the signal has a level which is one volt from a first quantization level and four volts from a second quantization level, the quantizer chooses between output levels one and two under control of a circuit responsive to the instantaneous level of the signal. In this instance, the circuit operates under a four-fifths probability toward the selection of the first (and closest) quantization level, and with but one out of five chances of selecting the second (more remote) quantization level. This biased random selection mode of operation breaks up the repetitive noise patterns, while minimizing the amount of additional noise introduced into the system.

Other objects and various advantages and features of the invention will become apparent by reference to the following description taken in connection with the appended claims and the accompanying drawings forming a part thereof. In the drawings:

Figure 1:
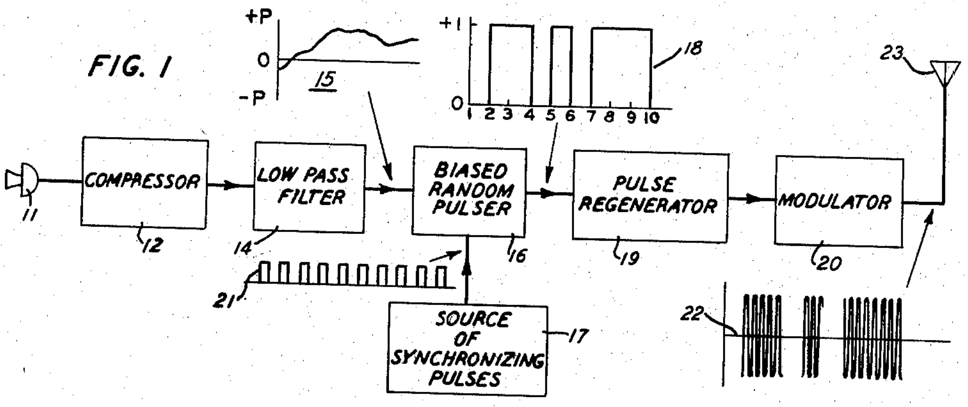
Fig. 1 shows a pulse code modulation transmitter in accordance with the invention.

Referring to the drawings, Fig. 1 shows, by way of example and for purposes of illustration, a block diagram of a pulse probability modulation transmitter. In Fig. 1, input signals, which may, for example, be speech signals from the microphone 11, are applied to the compressor 12. The compressor limits the amplitude of the signal intelligence to a predetermined value. The signals from the compressor 12 are applied to the low pass filter 14. For audio communication purposes, the low pass filter 14 may eliminate all frequencies above 4,000 cycles per second. A typical signal which might be present at the output of the filter 14 is shown in the plot 15.

The audio output from the low pass filter 14 is changed into pulse form in the biased random pulser 16, in a manner which will be explained in detail hereinafter. The period of the output pulses from the pulser 16 is determined by the source of synchronizing pulses 17. The pulse source 17 may be a multivibrator, and the output pulses 21 from this pulse source control the timing of the output pulses from the pulser 16. The present quantization process requires a sampling rate which is at least five times and preferably ten times the highest frequency passed by the filter 14. In particular, with the input signals applied to the pulser 16 having frequencies up to 4,000 cycles, the synchronizing pulses 21 have a regular repetition rate of at least 20,000 to 40,000 pulses per second.

The pulses 18 from the biased random pulser 16 are regenerated in the astable multivibrator 19, and control the modulator 20. For specific example, the output 22 to the antenna 23 is shown as a pulsed carrier. The pulses 18 may, however, control modulation of other types, such as frequency modulation, for example.

Figure 2:
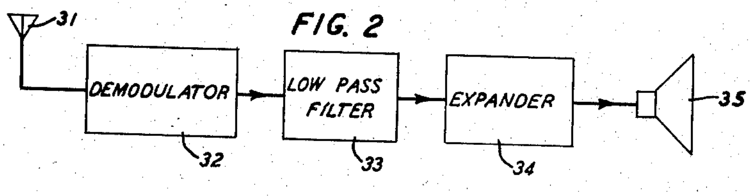
Fig. 2 represents the receiver associated with the transmitter of Fig. 1.

In Fig. 2 the block diagram of the receiver is shown. In the receiver the pulses of radio frequency energy are received at the antenna, and are demodulated in the unit 32. The signals are restored to their original form in the low pass filter 33 and in the expander 34, and are then applied to the speaker 35.

Referring again to Fig. 1, the plot 15 of the signal at the input to the pulser 16 has an upper limit +P and a lower limit −P. The action of the compressor circuit 12 has established these upper and lower limits. The pulse train 18 at the output of the biased random pulser 16 is closely related to the plot 15. At the output of the pulser 16, the presence of a series of pulses of unity amplitude corresponds to a signal approximating +P in plot 15, and the complete absence of pulses for a period of time corresponds to the −P value in plot 15. In the plot of Fig. 18, the presence of six pulses in the ten possible pulse positions reflects the fact that the signal 15 is somewhat closer to +P than to −P for the greater portion of the period under consideration.

Figure 3:
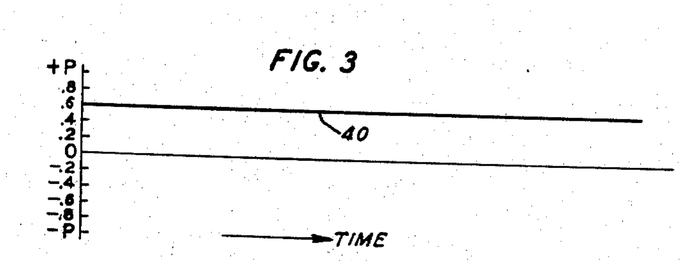
Figs. 3, 4 and 5 are a set of graphs in which the operation of the present quantization system is compared with the operation of a typical quantization system of the prior art.
Figure 4:
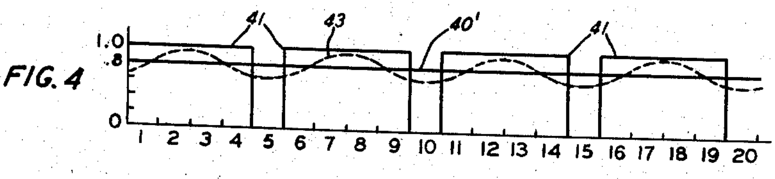
Figure 5:
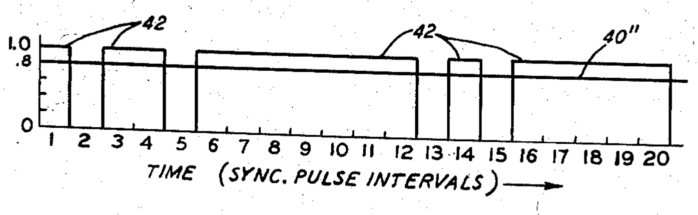

Considering Figs. 3 through 5, the mode of operation of the pulse probability modulation circuits in accordance with the present invention will now be contrasted with a typical quantization method of the past. For this purpose, it is assumed that the output from the compressor 12 is steady at .6 of the maximum value P which it may attain, as shown at 40 in Fig. 3. Translated into terms of the unit pulses which appear at the output of the quantization circuit, the steady input level 40 of Fig. 3 is shown as 40′ in Fig. 4, and as 40″ in Fig. 5.

Referring to Figs. 4 and 5, the pulse train 41 of Fig. 4 represents the output from a typical prior art quantization system, and the pulse train 42 of Fig. 5 represents the output from applicant's pulser 16 of Fig. 1. In the systematic quantization systems of the prior art, a repetitive pattern which is a submultiple of the sampling rate often appears. In the prior art plot of Fig. 4 the steady signal 40′ which is to be quantized may represent the constant slope of an input signal or the absolute value of the signal, for example. In Fig. 4, where the input level 40′ represents 0.8 of the unit amplitude of the pulses, eight out of ten, or four out of five pulses are present, and this averages to the desired eight-tenths of unity. However, in the systematic systems of the prior art as represented by Fig. 4, note that there are four pulses present, then one pulse absent, and that this pattern is repeated. Consequently, an undesired frequency component indicated by the dashed line 43 in Fig. 4 may be introduced into the signal by the repetitive quantization process. When this "noise" pattern falls within the signal band, the serious distortion discussed hereinabove occurs.

In applicant's system of Fig. 1, however, the use of the biased random pulser 16 avoids this disadvantage. Instead of systematic and repetitive quantization, the pulser 16 produces a pulse or no pulse in successive intervals in a quasi-random manner. More particularly, the probability of producing a pulse is increased as the input signal approaches its maximum value +P, and decreases as the signal approaches −P. Thus, in Fig. 4, where the input 40″ corresponds to .8 of a unit pulse, the probability that the biased random pulser 16 will produce a pulse is eight chances out of ten. The presence of sixteen pulses in the twenty time periods shown in Fig. 5 illustrates the biased operation of the random pulser. However, the random nature of the pulses 42 avoids the introduction of concentrated low frequency components of power, such as that indicated at 43 in Fig. 4.

The relative probabilities that the random pulser 16 will generate a pulse $x_n$ of unity value or will have no output in a given pulse interval, may be expressed mathematically in terms of the compressed input signal $y_n$ observed at the nth sampling instant and the limiting values +P and −P of the compressed signal, by the Relations 1 and 2, respectively, as follows:

$$x_n=+1 \text{ with a probability } \tfrac{1}{2}\left(1+\frac{1}{P}y_n\right) \qquad (1)$$

$$x_n=-1 \text{ with a probability } \tfrac{1}{2}\left(1-\frac{1}{P}y_n\right) \qquad (2)$$

where $x_n = +1$ corresponds to a pulse of unity amplitude, and $x_n = -1$ indicates the absence of a pulse in the embodiment of the invention illustrated in Fig. 1.

Accordingly, as $y_n$ approaches its maximum possible value +P, the probability that a pulse will be produced approaches a certainty. Similarly, the probability that no pulse will be produced approaches a certainty as $y_n$ approaches −P. When $y_n$=0, the chances for the occurrence or the absence of a pulse are even.

The biased random pulser 16 may be instrumented by any suitable circuitry which yields the foregoing probabilities. One possible arrangement is disclosed in application Serial No. 340,062 of W. H. MacWilliams, Jr. and R. C. Winans, which was filed March 3, 1953.

The principle of operation of the biased random pulser of W. H. MacWilliams, Jr. and R. C. Winans will now be described briefly. The output of a source of noise voltage, when limited to a predetermined band of frequencies, is used to obtain a random function. The random function used in the biased random pulser is the time interval between zeros in the noise voltage. Two zeros will nearly always occur in the period of the lowest frequency present in the noise voltage; thus, the probability of the occurrence of two zeros in this time interval is essentially unity. Two zeros will practically never occur in a time interval shorter than the period of the highest frequency; thus, the probability of the occurrence of two zeros in this time interval is essentially zero. Furthermore, it may be shown that the probability of the occurrence of two zeros in a predetermined time interval decreases with decreases in the time interval. If two zeros do, in fact, occur during the predetermined time interval, an output pulse is produced. If two zeros in the noise voltage do not occur during the predetermined time interval, no output pulse is produced.

In the instrumentation of the biased random pulser, as described in application Serial No. 340,062, random pulses generated when the noise signal passes through zero are applied to a two-stage counter. The output from the first stage of the counter opens a gate coupled to the second stage of the counter. A timing circuit is also enabled by the output signal from the first stage of the counter. This timing circuit closes the gate after a delay determined by a variable control voltage. An output pulse may or may not be transmitted through the gate, depending on the relative time of occurrence of the second random pulse and the closing of the gate. The pulse from the second stage of the counter also recycles the circuitry preparatory to the next operation of the random pulser.

In the biased random pulser 16 of Fig. 1, therefore, the intelligence signal from the low pass filter 14 controls the length of the predetermined time interval of the biased random pulser 16. Pulses from the source of synchronizing pulses 17 initiate successive cycles of operation of the random pulser 16. Pulses are produced at the input of the pulse regenerator 19 in those sampling periods in which two zeros in the noise voltage occurred during the predetermined time interval established by the level of the signals from the filter 14.

A comparison of the plots of Figs. 4 and 5 gives a physical insight into the properties of the present quantization system. Specifically, the repetitive nature of the plot 41 introduces "noise" having a peak at a particular frequency, indicated by the period of the plot 43 in Fig. 4. With the irregular nature of the pulse pattern 42 of Fig. 5, however, no such noise peaks occur, and the quantization noise tends to be uniformly distributed over the entire frequency spectrum. The random nature of the quantization process illustrated in Fig. 5 yields somewhat greater over-all noise than the prior art quantization method shown in Fig. 4. In the present system as shown in Fig. 5, the noise is uniform over the frequency spectrum, and thus resembles "white" noise. Therefore it avoids the adverse effects, such as the contour lines, which may be observed with other quantization systems.

The quantitative results of mathematical analysis of the system of Fig. 1 will now be set forth briefly. The original signals at the output from the microphone 11 are a function of time, and will thus be designated $S(t)$. The compressor 12 of Fig. 1 reduces the amplitude of the signals $S(t)$ so that no signals are greater than a peak value designated P. The low pass filter 14 restricts the signals to frequencies below an arbitrary frequency designated W. The signals which are applied to the biased random pulser 16 are a compressed and frequency limited version of the original signals $S(t)$, and will be designated $y(t)$. In addition, the sampling rate, as determined by the frequency of the source of synchronizing pulses 17, is 2WD samples per second, where W is the bandwidth, as noted above.

Under these conditions, the ratio of signal power to quantizing noise power at the output from the low pass filter 33 in the receiver is:

$$\frac{DS^2}{(P^2-S^2)} \qquad (3)$$

where $S^2$ is the average power of the compressed signal, $P^2$ is the peak power of the compressed signal, and D is half the ratio of the sampling rate to the highest frequency W passed by the low pass filter 14.

In addition, it may be shown that:

$$\text{Ave}(z_m z_n)=0, \text{ when } m\neq n \qquad (4)$$

$$\text{Ave}(z_m y_n)=0, \text{ for all } m \text{ and } n \qquad (5)$$

where $$z=x-\frac{1}{P}y \qquad (6)$$

and $x=+1$ if a pulse is sent
$x=-1$ if no pulse is sent where the subscripts $n$ and $m$ designate specific sampling intervals, and where $y$ is the value of the compressed signal. This means that $z$ represents the error between the transmitted pulse and 1/P times the compressed limited signal $y$.

The formulae 4 and 5 appearing above are characteristic of white noise, and indicate that the noise adds powerwise to the compressed signal.

The foregoing discussion has considered the application of the principles of pulse probability modulation to systems having only two quantization levels. It also applies to systems having many quantization steps. In pulse code modulation systems of this latter type, it has been customary to select the quantization level which is closest to the level of the input signal at the instant of sampling. When pulse probability modulation is employed with such a system, the output quantization level above or below the input signal is selected. The higher or lower quantization level is selected by a random element biased toward the selection of the quantization level which is closer to the input signal.

It is to be understood that the above-described arrangements are illustrative of the application of the principles of the invention. Numerous other arrangements may be devised by those skilled in the art without departing from the spirit and scope of the invention.

What is claimed is:

1. In a pulse probability modulation system, a source of signals, means for compressing said signals to have a predetermined peak value, means for limiting the frequency of said signals to a predetermined maximum frequency, means for sampling the compressed limited signal at a rate which is at least five times said maximum frequency, and random quantization means responsive to said source of signals and independent of the random quality of said signals for selecting one of two possible output states in each sampling interval, said random means being biased toward selecting one of said two states with a probability of approximately $$\tfrac{1}{2}\left(1+\frac{1}{P}y\right)$$

and being biased toward selecting the other state with a probability of approximately $$\frac{1}{2}\left(1-\frac{1}{P}y\right)$$

where P is said predetermined peak value and $y$ is the amplitude of said compressed limited signal.

2. In a pulse probability transmission system, a transmitter including a source of signals, means for compressing said signals, means for limiting the frequency of said signals to a predetermined maximum frequency, means for sampling the compressed limited signal at a rate which is at least five times said maximum frequency, random quantization means responsive to said source of signals and independent of the random quality of said signals for selecting one of two possible output states in each sampling interval with a finite probability for selecting either of the two states under normal input signal conditions of operation, said random means being biased in accordance with the magnitude of said signals, and a receiver including a demodulator, a low pass filter, and an expander connected in series.

3. In a pulse probability transmission system, a transmitter comprising a source of signals, means for compressing said signals to have a predetermined peak value, means for limiting the frequency of said signals to a predetermined maximum frequency, means for sampling the compressed limited signals at a rate which is at least five times said maximum frequency, random means responsive to said source of signals and independent of the random quality of said signals for producing an output pulse or no pulse in each sampling interval, said random means being biased toward producing a pulse with a probability of $$\frac{1}{2}\left(1+\frac{1}{P}y\right)$$

and being biased toward producing no pulse with a probability of $$\frac{1}{2}\left(1-\frac{1}{P}y\right)$$

where P is said predetermined peak value and $y$ is the amplitude of said compressed limited signal, and modulation means for converting said output pulses into modulated radio frequency waves; and a receiver comprising the series combination of a demodulator, a low pass filter having its pass band limited to said predetermined maximum frequency, and an expander.

References Cited in the file of this patent

UNITED STATES PATENTS

| | | |
|---|---|---|
| 2,605,361 | Cutler | July 29, 1952 |
| 2,636,081 | Feldman | Apr. 21, 1953 |
| 2,662,113 | Schouten et al. | Dec. 8, 1953 |